Figure 1:
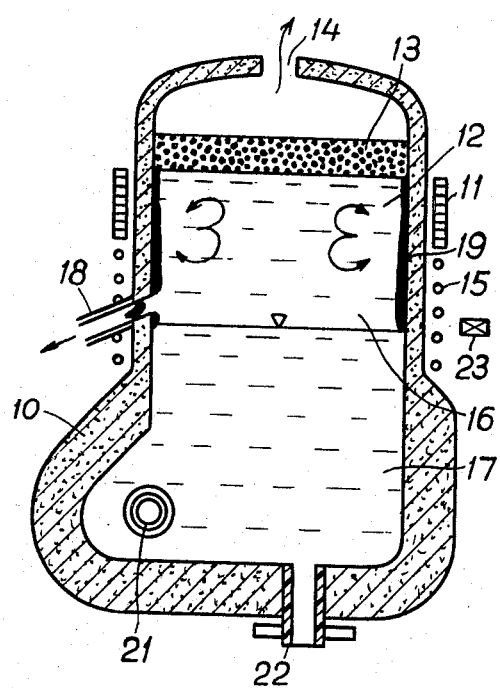

United States Patent
Hanås

[11] 3,869,560
[45] Mar. 4, 1975

[54] INDUCTION FURNACE FOR MELT REDUCTION

[75] Inventor: Bertil Henrik Hanås, Vasteras, Sweden

[73] Assignee: Allmanna Svenska Elektriska Aktiebolaget, Vasteras, Sweden

[22] Filed: Sept. 6, 1973

[21] Appl. No.: 394,774

[30] Foreign Application Priority Data
Sept. 7, 1972 Sweden............................ 11527/72

[52] U.S. Cl. .................................... 13/29, 13/32
[51] Int. Cl. ............................................ H05b 5/16
[58] Field of Search .................. 13/26, 27, 29, 32

[56] References Cited
UNITED STATES PATENTS
2,990,542  6/1961  Seitz ...................... 13/27
3,579,324  5/1971  Kennedy et al. ............... 13/26 X

*Primary Examiner*—R. N. Envall,, Jr.
*Attorney, Agent, or Firm*—Kenyon & Kenyon Reilly Carr & Chapin

[57] ABSTRACT

An induction furnace vessel containing a reduced metal layer, a slag layer thereupon and a reducing material layer upon said slag layer. Induction heating means is provided adjacent the reduced metal layer, cooling means adjacent the level where the slag floats on the reduced metal and additional induction heating means for heating the slag adjacent the reducing material layer.

5 Claims, 2 Drawing Figures

INDUCTION FURNACE FOR MELT REDUCTION

The present invention relates to an induction furnace for melt of metal oxides.

In different connections various methods have been discussed for manufacturing a carboniferous metal melt, for example of iron, chromium or other metals or mixtures of these from oxides of these metals. During melt reduction according to these principles, i.e., in the case of iron and other metals with high affinity to acid, the reaction $C + MO \rightarrow M + CO$ is endothermic, and therefore heat must be transferred to the reaction zone.

A problem is to transfer the heat liberated during the of combustible fuel to the reaction zone without oxidizing the reduced metal again.

There exist such processes where this has been overcome, for example the so-called Dored Process (British Pat. No. 991,579 and U.S. Pat. No. 3,169,055), but it has proved a problem to obtain an acceptable durability of lining in the furnace wall. The reason for this is that the heat is transferred to the melt from the space above the coke bed by way of the furnace lining.

As an interesting idea of solving this problem the following has heretofore been arrived at:

The main idea is that in the reduction the heat may be supplied to the melt by inductive heating, for example. The starting material is usually coke dust + ore concentrates and usually a flux, which are added to the surface of the melt and the heat from, for example, inductors of channel-type furnaces which heat the reduced metal melt, is supplied to the reaction layer through the slag which forms but which, however, is a bad conductor of heat.

It has been theoretically shown, however, that floating slag can be heated inductively by means of low-frequency alternating current (50 Hz) in a furnace having a diameter exceeding 5 meters, indicating that it would then be possible to obtain a good efficiency. However, if the reaction is allowed to take place on the surface of the slag in a low-frequency crucible furnace and the heat is supplied by way of the inductively heated underlying slag, the problem arises that if an iron bath is formed under the slag, this will "steal" the flux flow, i.e., the flow lines will substantially try to get to the part of the melt where the iron is.

By means of the present invention the advantages obtained in these two known processes are utilized. The invention relates to an induction furnace for melt reduction, comprising a heating and a heat retaining zone for reduced metal or metal alloy, the furnace at its upper part being provided with an inductive heating member (separated from the ordinary one) for the supply of the required reaction heat to the slag and from it directly to the reaction layer.

The furnace according to the invention is characterised in that a rest zone with no heating member is arranged between this slag heating zone and the heat retaining zone (at the ordinary inductors) at the lower part of the furnace, said rest zone separating said zones and being suitably provided with cooling members. In this way, a good control is obtained of reactions, temperatures and drainings in the case of melt reductions of the kind referred to here. Each zone is adapted to its limited process step, such as a heating zone with inductive supply of the necessary reaction heat to the floating slag, a rest zone for screening off the flux flow lines from the metal, for example the iron and for separating iron and slag, and drainage of slag. A holding zone is formed by the lower part in the furnace. It is intended for the formed (reduced) metal such as iron with inductive supply of the necessary holding heat by way of the ordinary inductors. This zone should also suitably be provided with a draining member.

The reaction zone, for example a floating coke bed, is arranged above the slag heating zone, and to this the supply of material (FeO (concentrates), coal or coke and lime) is added.

The invention is further exemplified in the accompanying drawing, of which

Figure 2:
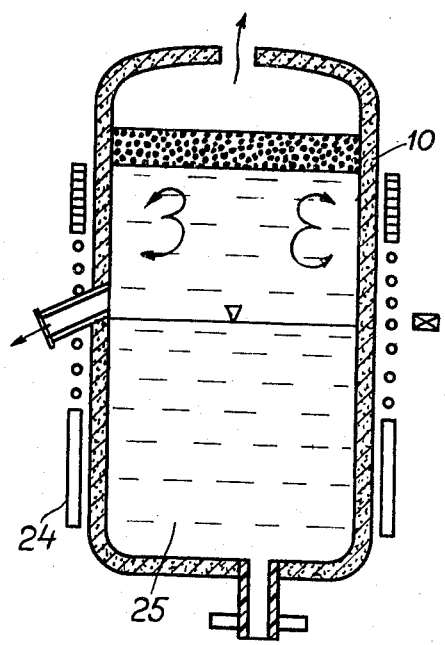

FIG. 1 shows a furnace of the channel type and
FIG. 2 a furnace of the crucible type.

FIG. 1 shows a furnace according to the invention, in which a vertically elongated vessel 10 holds the melt and a coil 11, preferably fed with low frequency current, is arranged around a heating zone 12 formed by floating slag. Ore concentrate and possibly other additives, such as iron ore concentrate and reducing agent, are fed to the furnace, and above the floating slag layer there already floats a coke bed or the like 13 forming the reaction zone.

Thus, the reaction zone 13 consists essentially of a coke bed and all material, for example pre-reduced coke dust, concentrates and possibly lime, are supplied from above at several points along the periphery. The necessary reaction heat comes from the underlying slag layer, and the gas formed, such as carbon monoxide, leaves through a hole 14 in the furnace roof. This gas may be utilized in a known manner in a power station, i.e., a boiler with a turbine and a generator for generating electrical energy. As mentioned, concentrates such as FeO, coal or coke and lime are fed (not shown) to the space above the reaction layer 13. The amount of CO which is burnt in the furnace covers only the local losses. The residual heat contents are utilized for said power generation. Concentrates and crude iron (formed in the production of iron) descend to the zone 12.

In the zone 12 an emulsion of floating slag and crude iron is obtained, which is heated inductively by the coil 11 around the furnace, and silmultaneously a strong movement of the bath is obtained (see the arrows in zone 12).

Below the coil 11 a coil of water-cooled tubes 15, not fed with current, is arranged and positioned around a rest zone 16 of the floating slag. We call it "rest zone" here, and it forms a zone for the separation of iron (or other metals) and slag. Iron (metal) is also extracted here from the concentrates, and simultaneously this zone 16 forms a "margin of commutation" between the coil 11 and the iron melt (in zone 17) lying below. The heat losses in the rest zone 16 are compensated for from above and below. The rest zone has also the task of screening off the flux flow lines from the iron, and slag may be drained away from this zone (at 18), for example intermittently through a tap hole at the lower part of the zone. Between the drainings the hole 18 is plugged up. The slag in zone 12 must be hot for the induction heating and for the reduction. When the furnace is used, frozen slag is obtained close to the furnace wall at 19, and this is a good protection for the rammed or bricked furnace lining.

In the lower heat retaining zone 17 there is crude iron or other metals or metal alloys, completely or partly obtained by reduction from the ore concentrate and the slag. This molten metal is kept at the desired temperature by means of one of more inductors 20, suitably exchangeable, of the channel type, where a melting coil which opens out into a furnace hearth thus constitutes the secondary circuit to a low-frequency primary coil 21, single-phase or multi-phase. Crude iron or other melt formed is tapped in batches or possibly continuously through tap hole having a control valve 22 applied at the bottom, for example of the type in which the electromagnetic law of force is utilized (see British Pat. No. 1,281,377). It is suitable to complete this valve with a valve of a type which is slidable or turnable and operated from the outside. Also the valve members should be made exchangable.

The water-cooling of the layer at the rest zone (from the coil 15) contributes to give the lining, and also the zone 12, a protective layer 19 of frozen slag. The cooling coil 15 should also extend a little below the top of the crude iron zone 17 to protect the lining at the critical part where the brim of the slag is located. In the heat retaining zone 17 the heat insulation should be made stronger to counteract the heat losses.

The lower slag brim should be kept at a certain desired level, and this should be controlled by means of a level meter 23, for example of contact type, of thermocouple type, of optical type, etc. This meter 23 could also be connected to a member (not shown) for supplying reducing agent and concentrates to the upper part of the furnace in order to keep the level in the desired position, for example immediately below the tap hole 18.

FIG. 2 shows an alternative embodiment to the furnace according to FIG. 1, which differs from this in that the heat source 24 for the heat retaining part 25 (corresponding to 17 in FIG. 1) consists of one or more outer coils, fed with low or high frequency.

At the start the lower part 17, 25 of these furnaces are first filled with molten iron and later the upper part with floating slag (coke dust + concentrates, etc., are charged later on). As the iron level rises draining may be performed, and also draining of slag.

The above invention may be varied in many ways within the scope of the following claims.

I claim:

1. An induction furnace for the melt reduction of metal oxides and comprising a vessel for containing a melt of reduced metal with slag floating thereon and reducing material floating on the slag and to which metal oxides are fed for reduction, and having a first means for inductively heating said reduced metal, means for cooling said vessel adjacent to the level where said slag floats on said reduced metal, and a second means for inductively heating said slag adjacent to the level where said material floats on said slag.

2. The furnace of claim 1 in which said vessel has an extended portion between said first and second heating means to hold an inductively unheated portion of said slag floating on said reduced metal and separating said slag inductively heated by said second means from said reduced metal a distance which substantially prevents loss of magnetic flux from said upper portion of slag via said reduced metal.

3. The furnace of claim 2 in which the said extended portion of said vessel is encircled by a conduit for a coolant and having a cooling capacity causing said slag to freeze on the inside of the extended portion to form a protective layer thereon.

4. The furnace of claim 3 in which said extended portion spans the interface formed by said slag and reduced metal.

5. The furnace of claim 4 in which said vessel has a tap hole for tapping said slag from its bottom level and a tap hole for tapping said reduced metal.

* * * * *

UNITED STATES PATENT OFFICE
CERTIFICATE OF CORRECTION

PATENT NO. : 3,869,560
DATED : March 4, 1975
INVENTOR(S) : Bertil Henrik Hanas

It is certified that error appears in the above-identified patent and that said Letters Patent are hereby corrected as shown below:

Column 1, line 4, after "melt" insert --reduction--

Column 1, line 13, after "during the" insert --combustion--

Signed and sealed this 1st day of July 1975.

(SEAL)
Attest:

RUTH C. MASON
Attesting Officer

C. MARSHALL DANN
Commissioner of Patents
and Trademarks